United States Patent [19]

Byrne et al.

[11] 4,452,938

[45] Jun. 5, 1984

[54] AMORPHOUS METAL COMPOSITES

[75] Inventors: Martin A. Byrne, Troy; John H. Lupinski, Scotia, both of N.Y.

[73] Assignee: The United States of America as represented by the United States Department of Energy, Washington, D.C.

[21] Appl. No.: 397,272

[22] Filed: Jul. 12, 1982

Related U.S. Application Data

[62] Division of Ser. No. 206,221, Nov. 12, 1980, Pat. No. 4,358,419.

[51] Int. Cl.$^{3}$ .................... C08K 3/08

[52] U.S. Cl. .................... 524/439; 524/440; 524/441

[58] Field of Search .................... 523/442, 458, 459, 512; 524/439, 440, 441

[56] References Cited

U.S. PATENT DOCUMENTS

| | | | |
|---|---|---|---|
| 2,472,247 | 6/1949 | Coleman | 524/439 |
| 3,923,946 | 12/1975 | Meyer | 264/122 |

FOREIGN PATENT DOCUMENTS

| | | | |
|---|---|---|---|
| 45-1755 | 1/1970 | Japan | 523/458 |
| 48-14779 | 5/1973 | Japan | 524/440 |
| 55-137177 | 10/1980 | Japan | 524/439 |
| 55-160072 | 12/1980 | Japan | 524/440 |
| 519298 | 3/1940 | United Kingdom | 524/439 |

*Primary Examiner*—Lewis T. Jacobs
*Attorney, Agent, or Firm*—Michael F. Esposito

[57] ABSTRACT

An improved amorphous metal composite and process of making the composite. The amorphous metal composite comprises amorphous metal (e.g. iron) and a low molecular weight thermosetting polymer binder. The process comprises placing an amorphous metal in particulate form and a thermosetting polymer binder powder into a container, mixing these materials, and applying heat and pressure to convert the mixture into an amorphous metal composite.

7 Claims, No Drawings

AMORPHOUS METAL COMPOSITES

The United States Government has rights in this invention pursuant to Contract No. ET-78-C-01-3205 between the U.S. Department of Energy and General Electric Corporation.

This is a division of application Ser. No. 206,221, filed Nov. 12, 1980 now U.S. Pat. No. 4,358,419, issued Nov. 9, 1982.

BACKGROUND OF THE INVENTION

This invention is directed to a new and improved amorphous metal composite. In particular, this invention relates to a new and improved amorphous metal composite comprising amorphous iron and a suitable thermosetting polymer binder. In general, the method of the present invention comprises placing an amorphous metal in particulate form (e.g., flakes or filaments) and a thermosetting polymer binder powder into a container; mixing these materials, and applying heat and pressure to convert the mixture into an amorphous metal composite. The resulting amorphous metal composite of the present invention may be utilized in motor stators providing increased electric motor efficiency and opportunities for innovative electric motor designs.

Amorphous iron alloys have great potential for use in many types of electrical devices because of their unusual magnetic properties. In order to take advantage of these properties it is necessary that the alloy be fabricated into 3-dimensional structures. Conventional casting techniques have been utilized in fabrication of the 3-dimensional structures. However, the structures produced by these conventional techniques have been found wanting because the quench rates are much too slow resulting in crystallization of the alloy. This crystallization destroys the amorphous nature of the alloy. Therefore, the unusual magnetic properties attributed to the composite alloy because of its amorphous characteristics are also destroyed.

Quenching techniques utilizing rotating wheels mounted in water baths are capable of producing amorphous metal ribbons which are 0.5–2 mils thick and usually under 2 inches wide. However, to fabricate parts from these ribbons, it is necessary that they be coated with a binder and pressed to produce laminated articles. This procedure is time consuming and expensive.

Recently, it has been discovered that new production techniques have yielded amorphous metal flakes or filaments possessing the same magnetic properties present in ribbons. This discovery has been used in various attempts to develop new and improved articles and processes where these amorphous metal flakes or filaments can be used to fabricate bulk molded parts possessing the high packing factor necessary for good electronic and power devices. The term packing factor is defined as the total volume of metal flake or filament over the total volume of the resulting molded part. A high packing factor is desired because the properties of the molded part should approach the properties of the amorphous metal flakes or filaments themselves. Experiments by applicants were initially directed to the use of epoxy resins as the binder for the amorphous flakes or filaments. Epoxy resins were selected because of their generally recognized properties of good adhesion to metal substrates. However, the experiments with these materials have led applicants to the conclusion that epoxy systems are not suitable as binders for the amorphous metal composite because (1) the resulting composite possesses an extremely low packing factor, and (2) epoxy binders are not capable of enduring the required high temperature annealing treatment (e.g. 300° C.).

In addition, applicants experimented with commercially available polymides and polyamideimides which are known to exhibit excellent thermal life at elevated temperatures. For example, DuPont NR-150 which is a polyimide precursor solution based on 2,2-bis-(3,4-dicarboxyphenyl) hexafluoropropane and mixtures of 4,4 oxydianiline (ODA) and p-phenylenediamine (PPD), and AI600, a polyamideimide manufactured by General Electric are useful binders for laminates of the amorphous ribbon segments mentioned previously. The use of these type of polymer solutions for the production of coated flakes or filaments made the attainment of the proper B-staging of the binder on the flake quite cumbersome and impractical. These same polymers, when utilized as dry powders, possessed adequate high temperature capability but lacked the melt flow characteristics needed to wet the flakes or filament during the molding operation.

Accordingly, the discovery of a suitable binder which can (1) withstand the high annealing temperatures, (2) possess suitable wet flow characteristics needed to wet the flakes or filament during molding, and (3) permit the resulting composite to obtain a high packing factor has not been made until the present invention.

SUMMARY OF THE INVENTION

It is an object of the present invention to provide a new and improved amorphous metal composite comprising amorphous iron flakes or filaments and a thermosetting polymer binder.

It is a still further object of the present invention to provide a new and improved amorphous metal composite possessing a high packing factor comprising a mixture of amorphous iron flakes or filaments and a thermosetting polymer binder.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention as embodied and broadly described herein, the process of manufacturing an amorphous metal composite may comprise placing a thermosetting polymer binder powder and amorphous metal in particulate form into a container. The powder and metal are agitated in the container to form a mixture. The resulting mixture is transferred to a mold where heat and pressure are applied in amounts sufficient to convert the mixture to an amorphous metal composite. The heat and pressure are removed enabling the resulting composite to return to ambient condition. Finally, the resulting composite is removed from the mold.

In a preferred embodiment of the process of the present invention the thermosetting polymer binder powder and particulate amorphous metal are placed directly into the mold and agitated in the mold. This embodiment eliminates the necessity of transferring the mixture from the container to the mold.

In a further preferred embodiment of the present invention, the process of manufacturing the amorphous metal composite comprises placing a thermosetting polymer binder powder in a mold in an amount sufficient to form a layer of binder powder on the bottom of the mold, placing amorphous metal in particulate form on the layer of binder, repeating the binder and metal application steps until the desired amount of binder and metal are placed in the mold, closing the mold, applying heat and pressure to the mold to convert the binder and metal to an amorphous metal composite, removing the heat and pressure to enable the composite to return to ambient conditions in the mold, and, finally, removing the composite from the mold.

In a still further preferred embodiment of the process of the present invention the application of heat and pressure comprises heating the mixture in the mold to a temperature of at least about 300° C. while increasing the pressure to about 8000 psi, maintaining the mixture under these conditions for a period of time sufficient to enable creeping to subside, and, after creeping has subsided, increasing the pressure to about 60,000 psi for about 40 minutes. In this embodiment it should be understood that the term "creeping" refers to the movement of the upper and lower platens of the molding apparatus which provide the pressure to the mold. During the initial heating and pressurizing (i.e., 8000 psi) the thermosetting binder will, of course, melt and the platens will creep (i.e., move together) to further compact the mixture in the mold. Once the platens have moved or creeped to compensate for the melting of the binder material, the position of the platens stabilizes. Accordingly, creeping has subsided. It is at this point that the additional pressure is applied to the mold.

In another preferred embodiment of the process of the present invention, the amorphous metal is selected from a particulate form including flakes or filaments.

In still another preferred embodiment of the process of the present invention the amorphous metal flakes or filament are aligned lengthwise in the mold parallel to the length of the mold.

In a further aspect of the present invention the amorphous metal composite possessing a high packing factor comprises amorphous metal and a low molecular weight thermosetting polymer binder.

In a preferred embodiment of the present invention the amorphous metal composite comprises iron and a low molecular weight thermosetting polymer binder capable of withstanding annealing temperatures of at least about 300° C., such as polymers selected from the group consisting of polyesters, polyesterimides, polyetheramide acid and polyetherimides.

In a further preferred embodiment the thermosetting polymer binder possesses a molecular weight in the range of 1000 to 5000.

In a still further preferred embodiment of the present invention the amorphous metal composite comprises about 98 percent iron and about 2 weight percent binder.

In another preferred embodiment of the present invention the amorphous metal composite comprises amorphous metal and a low molecular weight thermosetting binder; the composite possessing a high packing factor (e.g., above 60%). The term packing factor, as stated previously, is defined as the total volume of the metal in the composite over the total volume of the composite. Most preferably, the amorphous metal composite will have a packing factor of over 80%.

The amorphous metal composite of the present invention minimizes or eliminates the foregoing disadvantages associated with the production of amorphous metal composite and the composite per se. The amorphous metal composites possess the high packing factor necessary for the production of motor stators which can be used in improved electronic or power devices.

Reference will now be made in detail to the present preferred embodiment of the invention.

DETAILED DESCRIPTION OF THE INVENTION

In general, the process of the present invention comprises placing a low molecular weight thermosetting polymer binder powder and amorphous metal in particulate form into a container. Preferably, the amorphous metal includes iron flakes or filaments, and the low molecular weight polymer has a range of about 1000 to 5000 and is selected from the group consisting of polyester, polyesterimides, polyetheramide acid, and polyetherimides. The binder powder and metal are agitated in the container to form a mixture. This mixture is transferred to a mold where heat and pressure are applied in amounts sufficient to convert the mixture to an amorphous metal composite. The heat and pressure are discontinued enabling the resulting composite to return to ambient conditions. The resulting composite is then removed from the mold.

Preferably, in the process of the present invention the thermosetting polymer binder powder and particulate amorphous metal are placed directly into the mold, and agitated to form the mixture. This procedure eliminates the necessity of transferring the mixture from the container to the mold.

In particular, the process of the present invention comprises placing a low molecular weight thermosetting polymer binder powder in a mold in an amount sufficient to provide a layer of binder on the bottom of the mold, placing amorphous metal in particulate form on the layer of binder, repeating the binder and metal application steps until the desired amount of binder and metal are placed in the mold. The mold is closed and heat and pressure are applied in an amount sufficient to convert the binder and metal mixture to an amorphous metal composite. The heat and pressure are removed enabling the composite to return to ambient conditions. The composite is then removed from the mold.

The heating and pressurizing of the binder and metal mixture in the mold may be performed in two stages. First, the mixture in the mold is heated by the mold platens to at least about 300° C., preferably 360° C. while increasing the pressure to about 8000 psi. The mixture is maintained under these conditions for a period of time sufficient to enable platen creeping to subside. After creeping has subsided, the pressure is increased to about 60,000 psi for about 40 minutes to produce the amorphous metal composite.

In a further preferred embodiment of the process of the present invention, the amorphous metal flakes or filaments may be placed in the mold in a manner so that the flakes or filament are aligned in the mold. That is, the flakes or filaments are aligned lengthwise in the mold parallel to the length of the mold.

The resulting amorphous metal composite of the present invention produced by the above described process comprises amorphous metal and a low molecular weight thermosetting polymer binder. In particular, the polymer is capable of withstanding anealing temperatures of at least about 300° C. and possess a molecular weight within the range of about 1000 to 5000. Polymers selected from the group consisting of polyesters, polyestermide, polyetherimides, and polyetheramide acid are suitable.

The polyester used is of the type described in U.S. Pat. No. 4,074,006 made from terephthalic acid, ethylene glycol and glycerine. The sample used contained 0.5% tetraoctyltitanate catalyst and 0.25% FC 430 fluorocarbon surfactant (made by 3M Company) and was spray dried from a methylene chloride solution to give a fine powder.

The polyesterimide employed is a glassy solid and is made from the melt polymerization of dimethylterephthalate, ethylene glycol, tris-hydroxyethyl isocyanurate, trimellitic anhydride, p,p'-methylene dianiline (MDA) and a titanium transesterification catalyst. The resulting polymer was granulated in a mortar and pestle to a fine powder.

The polyetherimides are derived from polyetheramide-acids as described in U.S. Pat. No. 4,098,800 comprising a 5:6 mole ratio of 2,2-bis (4-(3,4-dicarboxyphenoxy)phenyl) propane dianhydride (4,4'-BPADA) and MDA, which is subsequently heated under a nitrogen atmosphere to effect cyclization. The oligomer (83% imidized after heating) is used as a fine powder. Binder materials are not limited to these stoichiometries, nor is the imidization necessary as the polyetheramide-acid oligomer (0% imidized) works just as well.

To further illustrate the method of the present invention the following examples are presented.

EXAMPLE 1

A polyetheramide-acid oligomer of the type described in U.S. Pat. No. 4,098,800 comprising a 5:6 mole ratio of 2,2-bis[4-(3,4 dicarboxyphenoxy) phenyl] propane dianhydride (4,4' BPADA) and 4,4'methylene dianiline (MDA) is heated under a nitrogen atmosphere to effect cyclization. The oligomer (83% imidized after heating), is used as a fine powder. Binder materials are not limited to these stoichiometries or amine monomers.

The mold used is in the shape of a rectangular bar (5×½") and is made from high strength Kinite®. Silicone spray parting agent S512 is used as a mold release.

The mold is loaded by placing a layer of polyetherimide binder powder on the bottom of the mold cavity and the amorphous metal flake (0.375×0.030×0.001") is added evenly on top. The binder and flake are alternatively loaded into the mold cavity for a total of 17 g of flake and 3.5 g of binder. The top plunger is set in place and the mold is placed between the preheated platens (360° C.) and pressed under mild pressure (8,000 psi). Mold heat-up is rapid and the platens begin to creep within 2 minutes as the binder melts and wets the flake. When the creeping subsides, the plunger is pressurized to 60,000 psi and held for 40 minutes. During this operation, excess resin is squeezed out of the mold, leaving a final composition containing approximately 98 weight percent of amorphous metal flake and approximately 2 weight percent of crosslinked polymer. The mold is then cooled under pressure to ambient temperature and dismantled. The resulting amorphous metal composite has a packing fraction of 0.81 and is very rigid with a 4 mil variance in thickness along the 5" bar.

EXAMPLE 2

A polyesterimide of the general type as described in pending application Ser. No. 867,939 filed Jan. 9, 1978, now U.S. Pat. No. 4,233,435, issued Nov. 11, 1980, can be used as the binder. Polyesterimide resin 11102-74P was granulated by mortar and pestle to a fine powder. This binder was layered with flake in the mold as described in example 1 and the plunger set in place.

This resin sample has a lower fusion temperature than the polyetherimide of example 1 and begins to melt within seconds after the mold has been put in contact with the platens preheated at 360° C.

The plunger is held under mild pressure (8,000 psi) until the creeping has subsided and then the pressure is raised to 60,000 psi and held for 25 minutes to effect cure. The mold is cooled to room temperature and dismantled. The resulting rigid composite has a packing fraction of 0.76 with a 7 mil variance in thickness along the 5" bar.

EXAMPLE 3

A fusible polyester powdered resin as described in U.S. Pat. No. 4,074,006 is used as the binder in this composite. This Alkanex* powder contained 0.5% tetraoctyltitanate catalyst and 0.25% FC 430 fluorocarbon surfactant and had been spray dried from a methylene chloride solution to give a fine powder. Flake loading was the same as in example 1. The plunger was set in place and the mold placed between the preheated platens (350° C.) This material also has a low fusion temperature and the platens creep within seconds after mold contact. The binder melts and wets the flakes under low pressure (8,000 psi). When creeping has subsided the plunger is pressurized to 60,000 psi and held for 25 minutes. The mold is cooled under pressure and dismantled. The resulting rigid bar has a packing fraction of 0.80 and a 7 mil variance in thickness along the bar.

*Alkanex, Trademark of General Electric Company.

EXAMPLE 4

A rectangular bar similar in composition to that described in example 1 was heat treated at 350° C. for 2 hours in an inert atmosphere. The bar maintained its rigid structure and had a weight loss of 0.1% which is equivalent to approximately 6% binder volatilization. Bar dimension measurements before and after annealing show a 5% expansion in the sample.

EXAMPLE 5

A bar similar in composition to the one described in example 2 was heat treated at 300° C. for 2 hours in an inert atmosphere. The bar maintained its rigid structure and has a weight loss of 0.2% which corresponds to approximately 12% binder loss due to volatilization. Bar dimensions measured before and after the annealing show an increase in size of 2%.

To further illustrate the improved results of the present invention various high temperature binders have been used in forming the amorphous metal composites. The method used in forming the composite was substantially the same as that set forth in Example 1, above. The results obtained with various high temperature binders is set forth in Table I.

TABLE I

| Binder[a] | PF (%)[d] | Resin (Vol. %) | Cure (°C./min.) | Pressure KPSI | Thickness[b] Variance |
|---|---|---|---|---|---|
| Torlon[c] | 59 | 12 | 340/55 | 100 | 7 mil |
| TP-PEI[c] | 65 | 17 | 340/40 | 100 | 5 mil |
| EI | 75 | — | 330/40 | 60 | 12 mil |
| PEI | 81 | 7 | 330/40 | 60 | 4 mil |
| PAA | 78 | — | 330/40 | 60 | 7 mil |
| Alk. | 80 | 6 | 320/25 | 60 | 7 mil |

[a]Torlon = thermoplastic polyamideimide available from Amoco
TP-PEI = thermoplastic polyetherimide
EI = polyesterimide
PEI = polyetherimide
PAA = polyetheramide-acid
Alk = Alkanex[R] polyester
[b]Thickness variance - variance in thickness along the length of the bar or the surface of the disc.
[c]1" circular mold.
[d]PF = Packing Factor The results shown in Table I are further supplemented by the following observations. While Torlon gave a composite with a moderate packing fraction the edge of the composite crumbled when handled because of the poor fusibility of the binder. The TP-PEI binder sample possessed a high metal density. However, because of the thermoplastic nature of TP-PEI, this material cannot tolerate the 300° C. annealing. The polyetherimide and polyetheramide acid both derived from MDA (4,4′ methylene dianiline), polyesterimide, and polyester binders gave the best results in terms of packing factors. This, most likely, can be attributed to the adhesive ability of the binders as well as the high temperature processing necessary to cure the binders. The polyetherimide polymers, as seen from Table I, produced the best results and therefore were chosen for pressure, time, and alignment studies of amorphous metal composites. Table II, III and IV, below set forth the results of these studies with various polyetherimide binders.

TABLE II

| Composite Sample # | Pressure (KPSI) | PF (%) | Cure (°C./Min) | Binder[a] |
|---|---|---|---|---|
| 11496-146-2 | 15 | — | 330/40 | PEI |
| 11603-7 | 19 | 69 | " | " |
| 1106-4 | 30 | 74 | " | " |
| 11496-151 | 40 | 77 | " | " |
| 11496-130 | 60 | 81 | " | " |
| 11603-21 | 80 | 81 | " | " |

[a]Polyetherimide powder as described in Example I.

Table II shows the effect of pressure using identical curing schedules in a 5″×½″ mold. As the pressure is reduced, the packing factor (PF) of the composite decreases accordingly.

Table III, below, shows that cure schedule and degree of crosslinking of the polymer is also an important criterion for the packing factor. As the cure time is shortened and the polymer is undercured, it loses its rigid character and the packing factor is reduced. The improved packing factor of sample 11496-144 is not due to the increased time, but rather it is due to prealignment of the flake. An identical sample with aligned flake pressed for 40 minutes gave the same packing factor of 87%. The effect of alignment will be discussed in the next paragraph.

TABLE III

Effect of Cure on Composite PF

| Composite Sample #[a] | Time Above 300° C. (min) | PF (%) | Cure (°C.) | KPSI |
|---|---|---|---|---|
| 11603-10 | 5 | 73 | 360 | 60 |
| 11603-11 | 17 | 75 | " | " |
| 11496-130 | 32 | 81 | " | " |
| 11496-144 | 122 | 87[b] | " | " |

[a]Binder - Polyetherimide powder a described in Example I.
[b]aligned flake

The composites discussed thus far were fabricated by random, but uniform loading of the flake with no attempt made to align the flakes parallel to the length of the mold. Alignment of flake was achieved by placing a thin partition directly down the center of mold dividing it into two 5″×¼″ segments. The flake and binder were then loaded and better alignment of the flake was achieved after removal of the partition. Table IV gives the results of random packing versus aligned packing at high and low compaction pressure. As can be seen, much better packing is achieved using this alignment method.

TABLE IV

Effect of Alignment

| Composite Sample #[a] | Aligned | PF (%) | KPSI | Cure °C./min. |
|---|---|---|---|---|
| 11496-130 | No | 81 | 60 | 330/40 |
| 11496-137 | Yes | 87 | 60 | 330/40 |
| 11603-7 | No | 69 | 19 | 330/40 |
| 11603-9 | Yes | 73 | 20 | 330/40 |

[a]Binder - polyetherimide powder as described in Example 1.

As an additional experiment the amorphous metal composites are produced using metal filaments with 0.015″×0.001″ cross section in place of metal flakes. All other conditions stayed the same. The results are set forth below, in Table V.

TABLE V

Fine Filament Composites

| Sample # | Binder[a] | PF (%) | KPSI | Cure (°C./min.) |
|---|---|---|---|---|
| 11603-12 | PEI | 88 | 60 | 330/40 |
| 11603-19 | PEI | 89 | 60 | 330/40 |

[a]Polyetherimide powder as described in Example I.

As shown by the results set forth in Table V, the highest packing factors have been achieved using fine filament amorphous metal.

The results of the above tests indicate that excellent amorphous metal composites can be produced using low molecular weight polyetherimide binders with the process of the present invention. Low molecular weight polyesters (Alkanex), polyesterimides, and polyetheramide acid can also be used producing amorphous metal composites possessing good properties.

What is claimed is:

1. A rigid amorphous metal composite having a packing factor of above 60% consisting essentially of a mixture of amorphous metal and a thermosetting polymer binder having a molecular weight between about 1000 to 5000.

2. An amorphous metal composite according to claim 1 wherein said amorphous metal is iron.

3. An amorphous metal composite according to claim 1 wherein said polymer binder is selected from the group consisting of polyesters, polyesterimides, polyetheramide acid, and polyetherimides.

4. A rigid amorphous metal composite consisting essentially of a mixture of amorphous iron and a thermosetting polymer binder possessing a molecular weight in the range of 1000 to 5000 and selected from the group consisting of polyesters, polyesterimides, polyetheramide acid, and polyetherimides.

5. An amorphous metal composite according to claim 4 wherein the mixture contains about 98 weight percent amorphous iron and about 2 weight percent polymer binder.

6. A rigid amorphous metal composite possessing a packing factor of above 60% consisting essentially of a mixture of amorphous iron and a thermosetting polymer binder capable of withstanding annealing temperatures of at least 300° C. and having a molecular weight between about 1000 to 5000.

7. An amorphous metal composite according to claim 6 wherein the thermosetting polymer binder possesses a molecular weight in the range of 1000 to 5000 and is selected from the group consisting of polyesters, polyetherimide, polyesterimides, and polyetheramide acid.

* * * * *